US008850882B2

United States Patent
Qu et al.

(10) Patent No.: US 8,850,882 B2
(45) Date of Patent: Oct. 7, 2014

(54) METHOD FOR MEASURING REACTOR BED LEVEL FROM ACTIVE ACOUSTIC MEASUREMENT AND ANALYSIS

(75) Inventors: Jianmin Qu, Atlanta, GA (US);
Laurence J. Jacobs, Atlanta, GA (US);
Limin Song, West Windsor, NJ (US);
Jormarie Bitar, Fairfax, VA (US);
Mark M. Disko, Glen Gardner, NJ (US)

(73) Assignee: ExxonMobil Research and Engineering Company, Annandale, NJ (US)

(*) Notice: Subject to any disclaimer, the term of this patent is extended or adjusted under 35 U.S.C. 154(b) by 605 days.

(21) Appl. No.: 12/455,895

(22) Filed: Jun. 9, 2009

(65) Prior Publication Data

US 2009/0314080 A1    Dec. 24, 2009

Related U.S. Application Data

(60) Provisional application No. 61/132,647, filed on Jun. 20, 2008.

(51) Int. Cl.
*G01F 23/00* (2006.01)
*G01F 23/296* (2006.01)

(52) U.S. Cl.
CPC .......... *G01F 23/296* (2013.01); *G01F 23/2966* (2013.01)
USPC ........................................ 73/290 V; 73/427

(58) Field of Classification Search
CPC ................................................. G01F 23/296
USPC ........ 73/290 V, 589, 579, 590, 592, 597, 599; 376/252
See application file for complete search history.

(56) References Cited

U.S. PATENT DOCUMENTS

| | | | | |
|---|---|---|---|---|
| 4,320,659 A * | 3/1982 | Lynnworth et al. | ............. | 73/589 |
| 4,765,186 A * | 8/1988 | Dieulesaint et al. | ........ | 73/290 V |
| 5,105,661 A * | 4/1992 | Sekita et al. | ................ | 73/290 V |
| 5,456,114 A * | 10/1995 | Liu et al. | ......................... | 73/597 |
| 5,943,294 A | 8/1999 | Cherek et al. | | |
| 6,053,041 A | 4/2000 | Sinha | | |
| 6,631,639 B1 * | 10/2003 | Dam et al. | ................. | 73/290 V |
| 7,114,390 B2 * | 10/2006 | Lizon et al. | ................ | 73/290 V |
| 7,178,396 B2 * | 2/2007 | Carkner et al. | ............. | 73/290 V |
| 7,607,347 B2 * | 10/2009 | Dockendorff et al. | ...... | 73/290 V |
| 2005/0149277 A1 * | 7/2005 | Bailey et al. | .................... | 702/54 |
| 2006/0031030 A1 | 2/2006 | Bennett et al. | | |
| 2007/0207710 A1 | 9/2007 | Montierth et al. | | |
| 2009/0282910 A1 * | 11/2009 | Song et al. | ................. | 73/290 V |

* cited by examiner

*Primary Examiner* — Hezron E Williams
*Assistant Examiner* — Hoang Nguyen
(74) *Attorney, Agent, or Firm* — Bruce M. Bordelon; Glenn T. Barrett; Ronald Hantman

(57) ABSTRACT

The present invention is a non-intrusive method to determine the fluid level in a vessel. In a preferred embodiment, the vessel is a delayed coker drum in a refinery. Waves are generated in the vessel from an outside source. For wall vibration generated in the frequency range of 1-20,000 Hz, accelerometers on the exterior wall of the vessel measures the attenuation of the vibration modes of the vessel. The fluid level can related to the attenuation of the vibration mode. For wall vibration generated in the ultrasonic range, the wave traveling in the vessel wall are guided waves. The guided wave will leak energy into the fluid inside the vessel and will attenuate depending on the fluid level. Ultrasonic receivers on the outside of the vessel measure the attenuation. The fluid level can be related attenuation of the ultrasonic waves.

10 Claims, 7 Drawing Sheets

Schematics diagram of vessel level measurement system

Schematics diagram of vessel level measurement system

Plot of wave phase velocity versus the product of frequency and wall-thickness. Effect of fluid loading (water) on wave speeds is extremely small so that it does not change the dispersion characteristics.

Plot of attenuation versus the product of frequency and wall-thickness. The effect of fluid loading (water) on attenuation is quite significant for some mode (e.g., A0) at low frequencies.

Plot of measurement resolution versus the product of the frequency and wall-thickness.

Plot of level sensing resolution versus attenuation of A0 mode for different transducer sensitivities.

Experimental set-up of ultrasonic level measurement for Example 2.

Comparison of experimental results of level measurement and model predictions.

METHOD FOR MEASURING REACTOR BED LEVEL FROM ACTIVE ACOUSTIC MEASUREMENT AND ANALYSIS

CROSS REFERENCE TO RELATED APPLICATION

This Application claims the benefit of U.S. Provisional Application 61/132,647 filed Jun. 20, 2008

BACKGROUND OF THE INVENTION

The present invention is a method to determine bed levels in a reactor. In particular, the present invention uses a non-intrusive method to monitor the bed level in the reactor in a refinery. More particularly, the method is used to monitor the fluid lever in a delayed coker drum.

It is important to know the bed level in a process reactor, particularly is a delayed coker, in a refinery. Delayed-coking is an important process which is used to convert vacuum resids to lighter distillates and produce coke as byproduct. Delayed-cokers are operated in semi-batch mode, with at least two coke drums. While one is being filled or coked, the other is being de-coked. During the coking cycle, the drum is gradually filled with liquid feed at elevated temperature (typically around 900 degree F.) from a bottom nozzle, vapor product leaves the drum at the top, and coke forms inside the drum as the result of a complex solidification process. During the decoking cycle, the drum is first cooled by steam or water. After cooling and draining, a high-pressure rotary water jet is used to cut coke loose, which is removed from the bottom of drum for transportation. Delayed coker are recognized as one of primary capacity bottlenecks at many refineries.

Refineries that have difficulty in knowing the exact level in the drum run two risks. One is that they overfill the drum. In this case the coke inside the drum starts to stick to the top outlet and to any structure on the top of the drum. When this occurs the drum needs to be shut down and manually cleaned. This leads to significant throughput loss and maintenance cost. The second risk is that in order to prevent the condition described above a large portion of the drum is left unfilled and unused. This unused volume represents a loss of throughput for the unit. For example, a five foot excess outage in a 100 foot tall drum represents a 5% throughput loss.

Due to the significant financial impact of this problem a few different methods to predict or measure the level have been developed. The least expensive one is to calculate the level from the feed conditions. This suffers from the difficulty in knowing the final density of the coke and is not reliable. Methods using ranging radar or sonar have to be installed inside the reactor and suffer severe fouling problems. Other methods using radioactive sources have also been developed to measure the bed level. These are more expensive, have radioactive hazards, and generally suffer from reliability issues (probably due to workers avoiding maintenance contact with radioactive devices). Other drawbacks of the radioactive devices are that they can only provide discrete level measurements, instead of continuous measurements provided by the current invention.

The dynamic response of a vessel filled with a liquid/solid to the excitation of a sound source varies with the level and properties of material in the vessel. These variations in the dynamic response result from the changes in the natural frequencies, mode shapes and attenuations when the fill level varies. In the present invention, these differences are recognized and successfully correlated to different fill levels in a vessel. By measuring the dynamic response of the vessel to a known excitation source, the fill level could be estimated. The main advantage of this approach is that it is non-intrusive, low cost and simple to install and use.

SUMMARY OF THE INVENTION

The present invention is a non-intrusive method to determine the level of material in a vessel such as a process reactor, or a liquid storage tank. In a preferred embodiment, the vessel is a delayed coker drum in a refinery. The method uses an acoustic/vibration source to generate vibration or elastics waves traveling along the vessel wall. The characteristics of the wall vibration depend on the fill level of the vessel. One or more acoustic/vibration receivers are strategically placed on the exterior surface of the wall, preferably along the vertical axis of the vessel to measure the vibration response of the wall to the source. The measured vibration signals are analyzed to determine the amount of the change in the characteristics of the wall vibration due to the fill level. A correlation model describing the change in characteristics of the wall vibration is used to estimate the fill level. This process will be repeated to provide continuous or periodic estimate of the fill level.

For excitation source in ultrasonic frequency range (>20,000 Hz), the generated waves are typically guided waves. For certain modes, the guided waves traveling along the vessel wall leak energy into the material inside the vessel and are attenuated accordingly. The amount of attenuation depends on the fill level. Based on this principle, an ultrasonic transmitter, with a pre-selected center frequency, is used to generate guided-waves traveling along the wall. One or more ultrasonic receivers are attached to the exterior surface of the wall, preferably along the vertical axis of the vessel, to measure the attenuation. The attenuation of the guided waves is used for estimating the fill level.

DETAILED DESCRIPTION OF THE PREFERRED EMBODIMENTS

Ultrasonic guided wave attenuation can also be used to monitor the fill level of a vessel. Guided waves, as they are propagating along the vessel wall, will leak energy into the fluid within the reactor. The amount of energy leaked depends on the wave modes, frequency and the fluid properties and level. By controlling the wave mode and frequency for a known fluid, the level of the fluid can be determined through monitoring the attenuation of the guided wave propagation.

Figure 1:
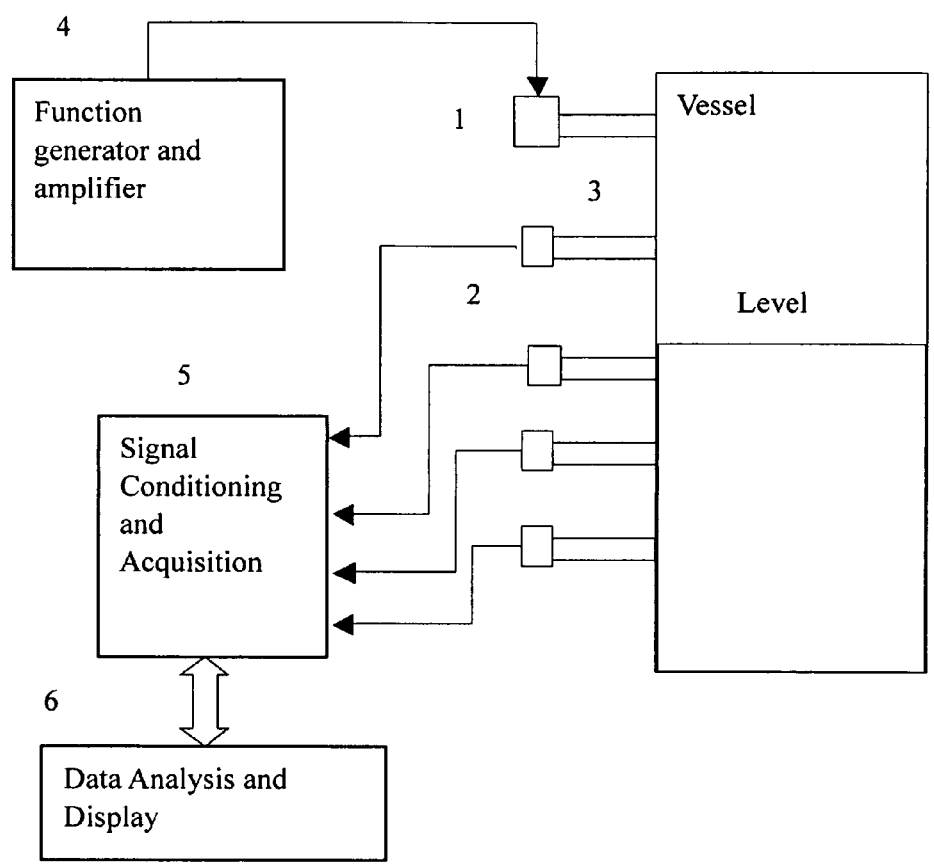
FIG. 1 shows a schematic drawing of the vessel level measurement system based on ultrasonic guided wave approach.

FIG. 1 shows a typical level measurement system based on guided wave approach. The system consists of ultrasonic transmitter (1), one or several ultrasonic receivers (2), wave matching wedges (3) for transmitter and receivers, a signal generator and amplifier unit (4), and a signal conditioning and acquisition unit (5), and data analysis and display unit (6). The location of the transmitter is preferably near the top of the vessel above the maximum fill level. The ultrasonic receivers (2) are strategically placed on the vessel wall on the same vertical line with the transmitter that is parallel to the vertical axis of the vessel along which the fluid surface rises. Both transmitter and receivers are selected to withstand high wall temperature (typically 900 degree F. for a delayed coker). The wave matching wedge (3) is design to couple the transducers with wall for efficient generation of certain wave modes, and could also be used to reduce the temperature from the wall to the transducers so that low cost transducers may be used. For multiple receivers, the number of the receivers and space between the adjacent receivers are determined by the requirement of the measurement resolution and range. A signal generator and amplifier unit (4) is used to drive the transmitter for guided wave generation. The signal conditioning and acquisition unit (5) is used to acquire the ultrasonic signals from the receivers, and a data analysis and display unit (6) is used to analyze the signals for estimating the fill level and display/report the fill level to the operation personnel, and preferably computerized. The parameters of the level measurement system are discussed in the next section.

Figure 2:
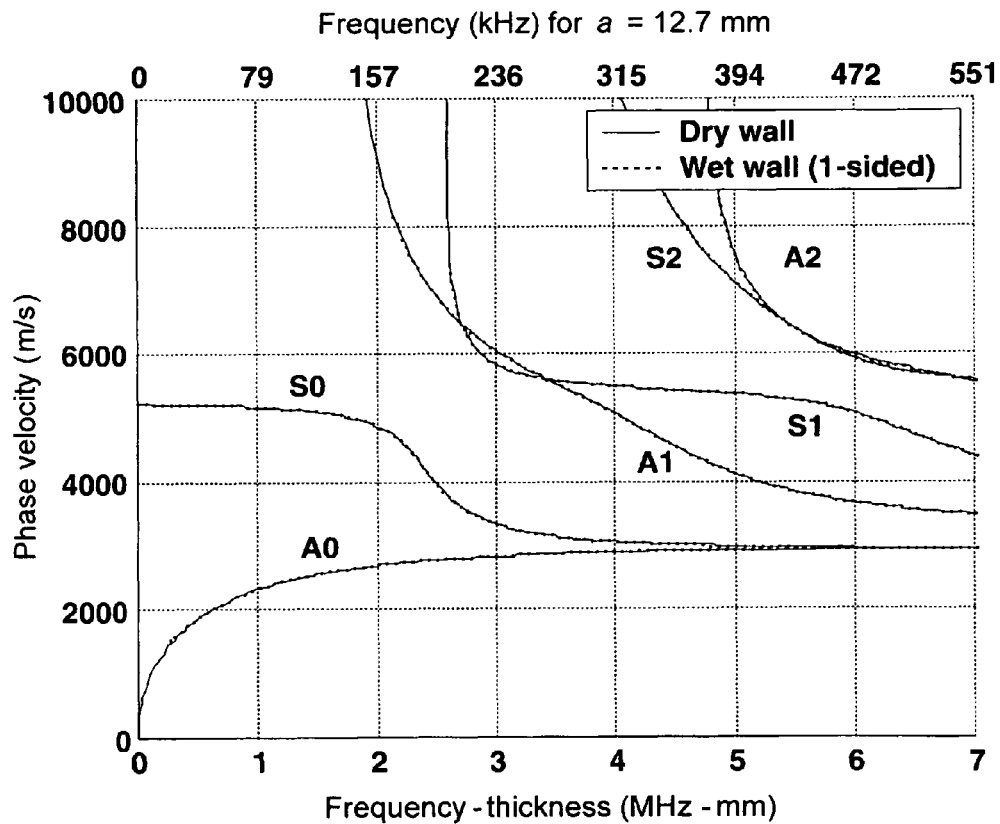
FIG. 2 shows the effect of fluid (water) on wave speeds, from numerical simulations.

Typically, a guided wave consists of many modes; each propagates with its own characteristics (speed and attenuation). Since more wave modes will result in more complicated signals, it is advantageous, for the attenuation measurement, to generate the least number of modes. To determine optimal modes and frequencies for the level measurement, a model is developed to simulate the guided wave propagation in the steel wall of a vessel containing a fluid, and the dispersion curves for different modes are computed with numerical simulations. Because the thickness of the wall of a typical reactor vessel is much smaller than other dimensions, the guided wave propagation in the vessel wall can be reasonably approximated by that in an infinite flat plate of the same thickness, subject to fluid loading on one side. For this model, the wall thickness is taken to be 12.7 mm (0.5") which is typical for a delayed coker drum. The results with water as fluid medium are shown in FIG. 2. Each line represents the dispersion curve of a particular wave mode. The solid lines are for the part of the wall above the fluid level (Dry), and the dished lines are for the portion immersed in water on one side (1 Side Wet). It is seen that the effect of fluid loading (water) on wave speeds is extremely small so that it does not change the dispersion characteristics.

Based on the results shown in FIG. 2, the A0 and S0 modes are good candidates for the attenuation measurement because: (a) they are in the low frequency range, therefore, can propagate longer distance, which minimizes the number of transducers needed; and (b) they are easier to be generated and detected; (c) at the low frequency range (<150 kHz for 12.7 mm (0.5") thick steel wall), only the A0 and S0 modes are generated. This makes the signal processing much easier. It should be noted that A0 mode is the first asymmetric mode, and S0 is the first symmetric mode respectively for guided wave propagation in a plate.

Figure 3:
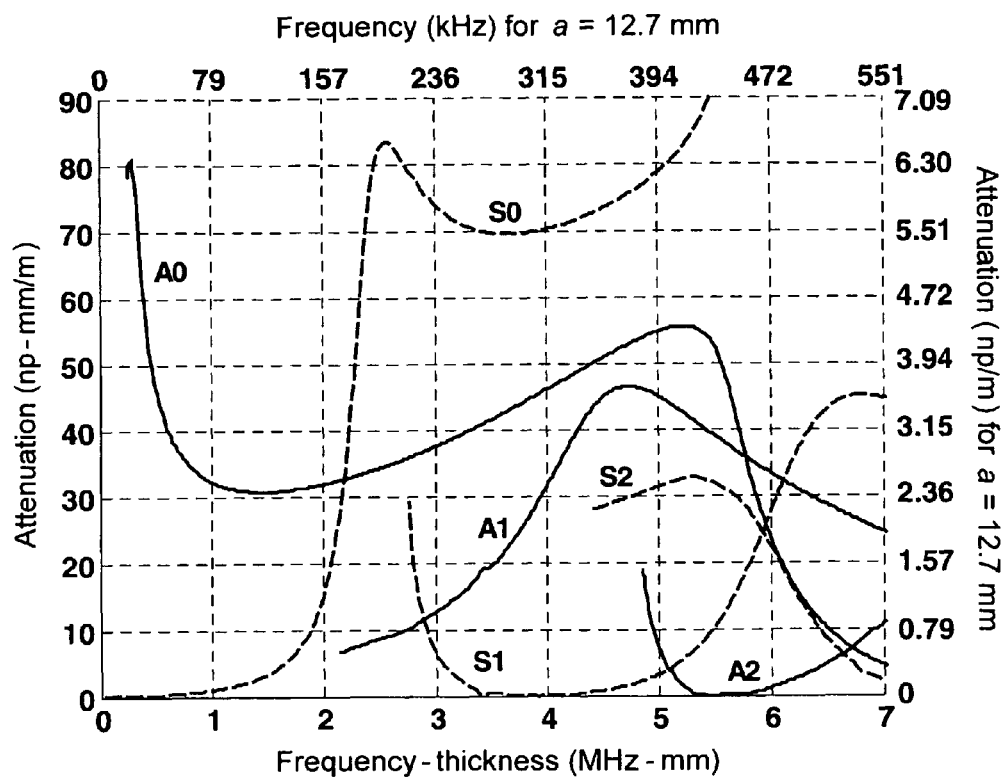
FIG. 3 shows the effect of fluid (water) on wave attenuation, from numerical simulations

A guided wave propagates in a dry plate without attenuation except for geometric spreading and wall-material inherent attenuation, both of which are independent of fluid level and generally very small. When one side of the plate is immersed in a fluid, the portion of propagating guided waves leak into the fluid and is attenuated. However, different modes attenuate differently. Shown in FIG. 3 is the attenuation of different modes as a function of the product of frequency and thickness. It is seen that the effect of fluid loading (water) on attenuation is quite significant for the A0 mode at low frequencies. For example, at 100 kHz, the A0 mode decays ~10 times per meter. On the other hand, the S0 mode attenuates much less. Therefore; A0 mode is the best mode for measuring the fill level with attenuation.

Figure 4:
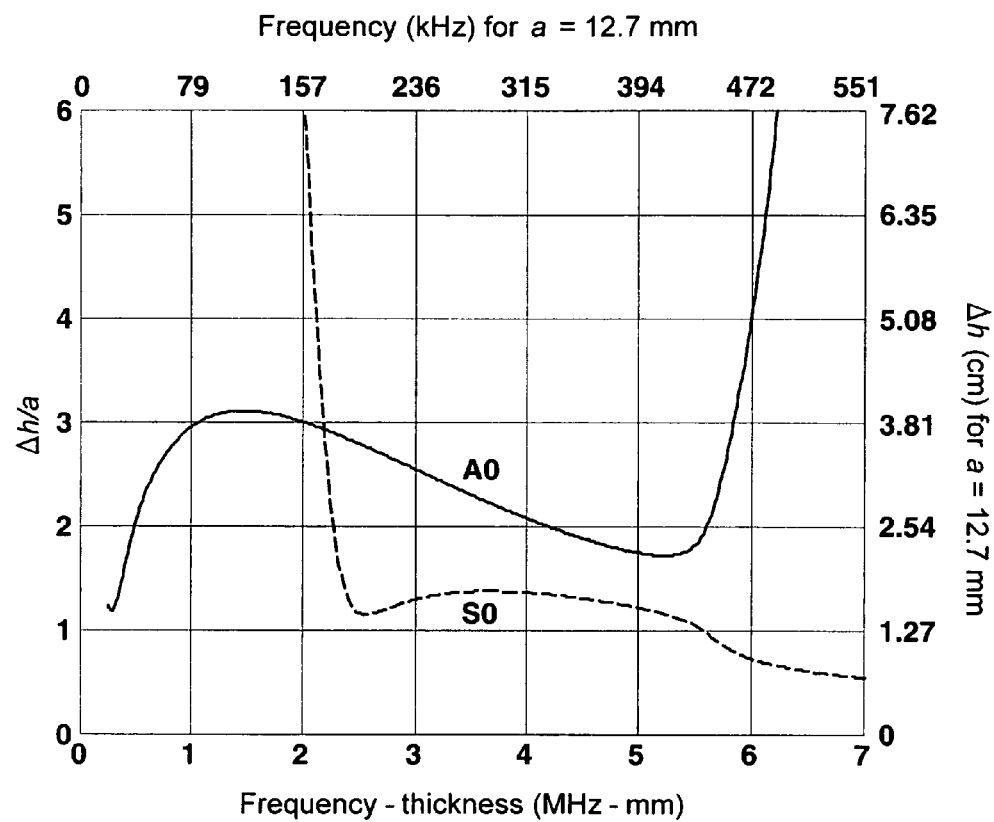
FIG. 4 shows the fluid level measurement resolution as a function of frequency for different modes, from numerical simulations.

Another consideration for selecting the A0 mode is measurement resolution. Let us assume that measurements are conducted at two fluid levels, $h_1$ and $h_2$. It then follows from Eq. 1S below that $$\Delta h = h_2 - h_1 = \frac{1}{\alpha_f - \alpha} \log_e\left(\frac{B_1}{B_2}\right), \quad (1S)$$

where $B_1$ and $B_2$ are the wave amplitudes received by Transducer B when the fluid levels are $h_1$ and $h_2$, respectively, and $\alpha_f$ and $\alpha$ are the attenuation coefficients for the vessel wall with and without the fluid respectively. Since the attenuation depends on the wave modes and frequency, the measurement resolution $\Delta h$ is also a function of the mode and frequency. Shown in FIG. 4 is the resolution normalized by the wall thickness a as a function of frequency for both A0 and S0 modes. It is seen that at lower frequencies (less than 150 kHz for a=12.7 mm), A0 gives much better resolution.

Figure 5:
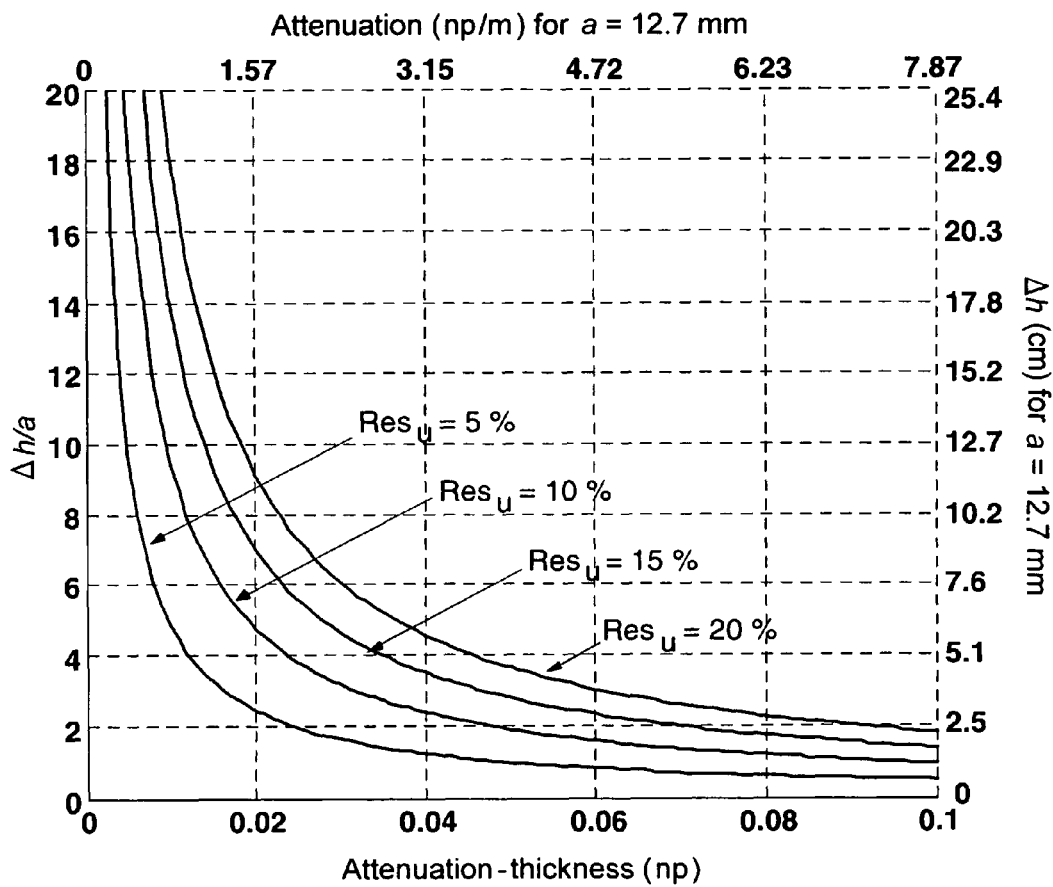
FIG. 5 shows the fluid level measurement resolution versus the attenuation for different transducer sensitivities, from numerical simulations.

FIG. 5 shows the fluid level sensing resolution versus the attenuation for different transducer sensitivities. It clearly shows that higher transducer sensitivity and higher attenuation improves the sensing resolution.

Though the analysis above shows that lower frequencies give more attenuation and better measurement resolution, too much attenuation also reduces the measurement range. In other words, for a given attenuation coefficient and a fixed distance between a pair of transmitter and receiver, there is a maximum liquid level beyond which the wave signal becomes so weak that it is no longer measurable. The selection of the frequency also depends on the efficiency of the wave generation of the transmitter. For practical consideration, the value of the product of the frequency and wall thickness in the range of 1.0 to 1.5 (MHz-mm) may be used to select the frequency of the guided waves for level measurement. For a wall thickness of 12.7 mm, an operational frequency around 100 KHz provide adequate measurements.

The emitted waves from the transmitter could be either continuous with constant amplitude and frequency, or intermittent pulses of given shape and pre-selected central frequency. When pulses are used, the pulse is generated with a pre-determined interval as required for updating the level measurement.

EXAMPLE 1

Figure 6:
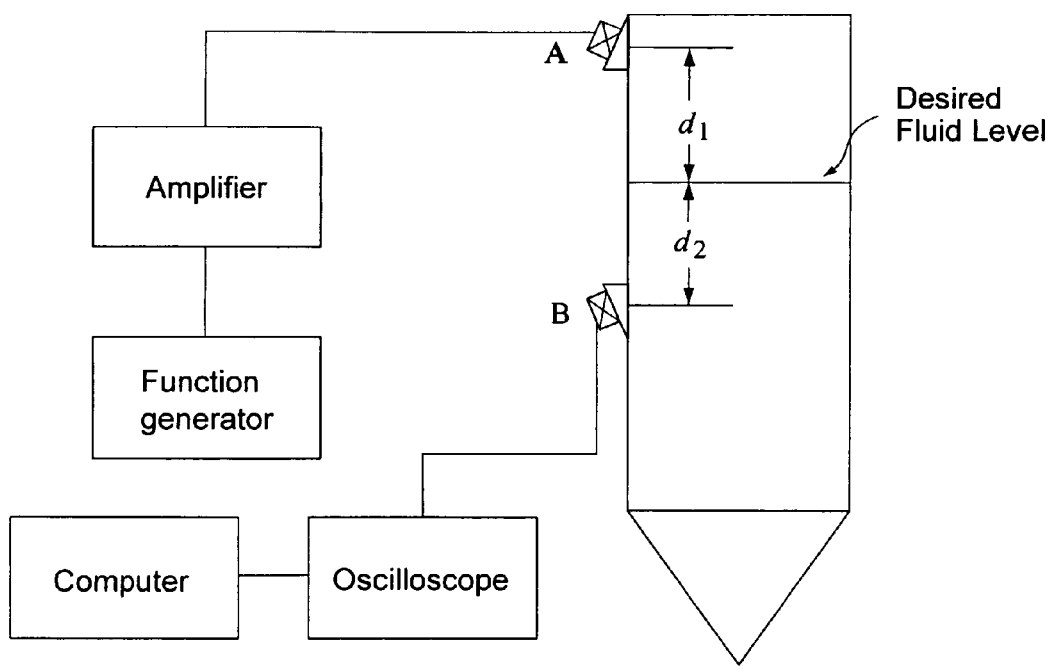
FIG. 6 shows a schematic drawing of the experiment setup for Example 2.

An experimental setup to monitor the fluid level in a vessel is shown in FIG. 6. Ultrasonic transducers are placed on the outside wall of the vessel, as illustrated in FIG. 6. During the filling process, Transducer A sends out a continuous wave of constant amplitude with certain frequency. The wave travels down the vessel wall as a guided wave and is received by Transducer B. The guided wave's amplitude decreases due to attenuation. The attenuation is much greater along the portion ($d_2$) of the wall immersed in the fluid than along the portion ($d_1$) of the wall above the fluid, because of leaking of energy into the fluid. Since the attenuation of wave amplitude per unit propagation length along the wall with and without fluid is known (either computed from the model or experimentally determined), the amplitude of the guided waves received at Transducer B enables us to estimate the fluid level in the vessel.

To illustrate the invention, let us assume, as shown in FIG. 6, that the distance between Transducers A and B is H. Let the distance between Transducer B and the top of the fluid be h. The distance between Transducer A and the fluid surface is thus given by H−h. Further, let the attenuation coefficients be $\alpha$ and $\alpha_f$ for the wall without and with fluid, respectively. If Transducer A sends out a wave with amplitude A, then by the time the wave reaches the fluid surface, its amplitude becomes $Ae^{-\alpha(H-h)}$. As the wave further propagates to Transducer B, its amplitude further reduces to $Ae^{-\alpha(H-h)}e^{-\alpha_f h}$. Let B be the wave amplitude received by Transducer B. Then, the value of amplitude B is given by $$B = Ae^{-\alpha(H-h)}e^{-\alpha_f h}. \tag{2S}$$

In the above equation, all parameters (A, $\alpha$ and $\alpha_f$) are known or can be measured prior to filling the vessel. During the filling process, once the wave amplitude B is measured by Transducer B, the fluid level h can be solved from Eq. (3S), $$h = \frac{\log_e(A/B) - \alpha H}{\alpha_f - \alpha}. \tag{3S}$$

In the experiment, a matching wedge is be used for Transducer A to generate the A0 mode below 150 kHz frequency range. A similar matching wedge is used for Transducer B to receive the A0 mode. Based on the wave amplitude received by Transducer B, the actual fluid level can be estimated using the method discussed above.

Figure 7:
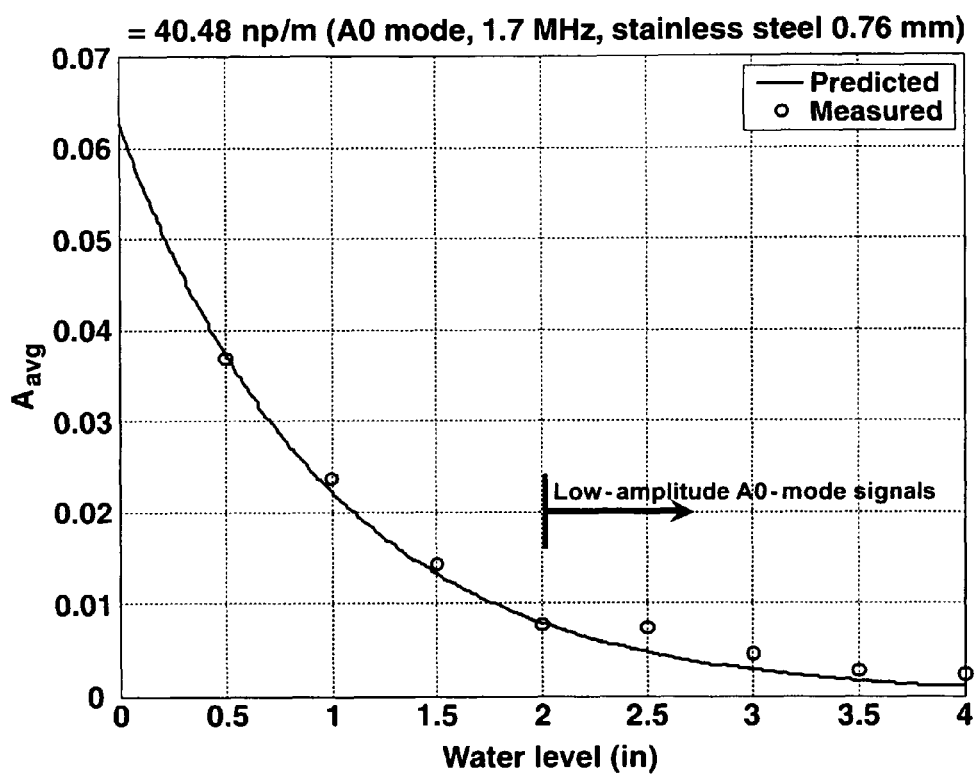
FIG. 7 shows a comparison of the experiment results of the fill level measurement and the predictions of the model for Example 2.

The fluid level in the vessel was measured using the methodology described above. Attenuation of the guided waves was measured at various fluid levels. The measured attenuation is then compared with the predictions based on the model described above. The comparison is shown FIG. 7, where the open circles represent the ultrasonically measured data and the solid line represents model predictions for each given fluid level. It is seen that the model prediction agrees very well with the experimental data.

APPENDIX

Guided Waves in a Free-Standing Plate

Consider a plate of thickness $2h$ placed in vacuum where the x-axis is along the plate and the z axis is perpendicular to the plate. Time-harmonic wave motion in the plate is governed by the reduced wave equation, $$c_L^2 \nabla(\nabla \cdot u) + c_T^2 \nabla \times (\nabla \times u) + \omega^2 u = 0, \tag{1}$$

where u is the displacement vector, $\omega$ is the angular frequency, and $C_L$ and $C_T$ are the longitudinal and shear velocities in the solid, respectively.

By a direct substitution, one can show that the general solution to representing a time-harmonic wave propagating in the x-direction with wavenumber k can be written as $$u_x(x,z) = [u_x^{(S)}(z) + u_x^{(A)}(z)]e^{ikx}, \quad u_z(x,z) = [u_z^{(S)}(z) + u_z^{(A)}(z)]e^{ikx}, \tag{2}$$

Where $$u_x^{(S)} = [-ikA_1\cos(\alpha_L z) - \alpha_T B_2 \cos(\alpha_T z)]e^{ikx}, \tag{3}$$

$$u_z^{(S)} = [-\alpha_L A_1 \sin(\alpha_L z) - ikB_2 \sin(\alpha_T z)]e^{ikx}, \tag{4}$$

represent the symmetric (with respect to the plane z=0) part of the wave motion, while $$u_x^{(A)} = -ikA_2 \sin(\alpha_L z) + \alpha_T B_1 \sin(\alpha_T z), \tag{5}$$

$$u_z^{(A)} = \alpha_L A_2 \cos(\alpha_L z) - ikB_1 \cos(\alpha_T z), \tag{6}$$

represent the anti-symmetric part of the wave motion. In these equations, $$\alpha_L = \sqrt{\frac{\omega^2}{c_L^2} - k^2}, \tag{7}$$

$$\alpha_T = \sqrt{\frac{\omega^2}{c_T^2} - k^2},$$

and the constants $A_1$, $A_2$, $B_1$, and $B_2$ are to be determined by the traction-free boundary conditions on both sides of the plate.

To this end, we use the Hooke's law to calculate the stresses, $$\sigma_{zz}(x,z) = [\sigma_{zz}^{(S)}(z) + \sigma_{zz}^{(A)}(z)]e^{ikx}, \quad \sigma_{zx}(x,z) = [\sigma_{zx}^{(S)}(z) + \sigma_{zx}^{(A)}(z)]e^{ikx}, \tag{8}$$

Where $$\sigma_{zz}^{(S)} = -\mu[(\alpha_T^2 - k^2)A_1 \cos(\alpha_L z) + 2ik\alpha_T B_2 \cos(\alpha_T z)], \tag{9}$$

$$\sigma_{zx}^{(S)} = \mu[2ik\alpha_L A_1 \sin(\alpha_L z) + (\alpha_T^2 - k^2)B_2 \sin(\alpha_T z)], \tag{10}$$

correspond to the symmetric displacement field, and $$\sigma_{zz}^{(A)} = -\mu[(\alpha_T^2 - k^2)A_2 \sin(\alpha_L z) - 2ik\alpha_T B_1 \sin(\alpha_T z)], \tag{11}$$

$$\sigma_{zx}^{(A)} = \mu[-2ik\alpha_L A_2 \cos(\alpha_L z) + (\alpha_T^2 - k^2)B_1 \cos(\alpha_T z)], \tag{12}$$

correspond to the anti-symmetric displacement field. In the above, $\mu$ is the shear modulus of the plate.

Substituting these into the traction-free boundary conditions, $$\sigma_{zz}(x, \pm h) = [\sigma_{zz}^{(S)}(\pm h) + \sigma_{zz}^{(A)}(\pm h)]e^{ikx} = 0, \tag{13}$$

$$\sigma_{zx}(x, \pm h) = [\sigma_{zx}^{(S)}(\pm h) + \sigma_{zx}^{(A)}(\pm h)]e^{ikx} = 0, \tag{14}$$

yields four homogeneous linear equations for the four constants $A_1$, $A_2$, $B_1$, and $B_2$, $$\begin{bmatrix} D_{11} & D_{12} & 0 & 0 \\ D_{21} & D_{22} & 0 & 0 \\ 0 & 0 & D_{33} & D_{34} \\ 0 & 0 & D_{43} & D_{44} \end{bmatrix} \begin{bmatrix} B_2 \\ A_1 \\ B_1 \\ A_2 \end{bmatrix} = 0, \tag{15}$$

where $$D_{11} = (\alpha_T^2 - k^2)\sin(\alpha_T h), \quad D_{12} = 2ik\alpha_L \sin(\alpha_L h), \tag{16}$$

$$D_{21} = 2ik\alpha_T \cos(\alpha_T h), \quad D_{22} = (\alpha_T^2 - k^2)\cos(\alpha_L h), \tag{17}$$

$$D_{33} = (\alpha_T^2 - k^2)\cos(\alpha_T h), \quad D_{34} = -2ik\alpha_L \cos(\alpha_L h), \tag{18}$$

$$D_{43} = -2ik\alpha_T \sin(\alpha_T h), \quad D_{44} = (\alpha_T^2 - k^2)\sin(\alpha_L h), \tag{19}$$

For non-trivial solutions, we must have either $$\bar{\Delta}_S(\omega, k) = D_{11}D_{22} - D_{12}D_{21} = 0, \tag{20}$$

or $$\bar{\Delta}_A(\omega, k) = D_{33}D_{44} - D_{34}D_{43} = 0. \tag{21}$$

These two equations are called the Rayleigh-Lamb dispersion equations. Solutions to these equations provide the relationships between the frequency ω and the wavenumber k. Such ω–k relationship is called the dispersion relationship. Making use of the relationship ω=kc, where c is the phase velocity of the propagating guided wave, the dispersion relationship can also be expressed as velocity versus frequency curves as shown in FIG. 6. Since there are multiple solutions to (20)-(21), many dispersion curves exist for a given plate. Each curve is called a mode. The curves corresponding to (20) are called symmetric modes, because the displacement vectors (eigenvectors of (15)) correspond to $u_x^S$ and $u_z^S$ which are symmetric with respect to the z=0 plane. Analogously, the curves corresponding to (21) are called anti-symmetric modes, because the displacement vectors correspond to $u_x^A$ and $u_z^A$ which are anti-symmetric to the z=0 plane. The first (lowest in frequency) anti-symmetric mode is called the A0 mode, while the first symmetric mode is called the S0 mode.

We note that (20)-(21) have only real solutions for real frequencies. Therefore, the guided waves propagate along the plate without attenuation.

Guided Waves in a Fluid-Loaded Plate

Consider the same free-standing plate of thickness $2h$ placed on a fluid on one side. The guided wave propagating in the plate can still be represented by the general expression (2). Assume that the fluid has mass density $\rho_f$ and phase velocity $c_f$. Then, the wave field in the fluid can be written as $$u_x^f = -\frac{k}{\omega} C[\cos\alpha_f z + \sin\alpha_f z] e^{ikx}, \qquad (22)$$

$$u_z^f = \frac{\overline{\alpha}}{\omega} C[\cos\alpha_f z + \sin\alpha_f z] e^{ikx}, \qquad (23)$$

where C is a constant to be determined from the interfacial condition between the fluid and the plate, and $$\alpha_f = \sqrt{\frac{\omega^2}{c_f^2} - k^2}. \qquad (24)$$

The corresponding stresses in the fluid are $$\sigma_{zz}^f = -i\rho_f\omega C[\cos\alpha_f z + \sin\alpha_f z]e^{ikx},\ \sigma_{zx}^f = 0. \qquad (25)$$

On the solid-fluid interface, we assume that the displacement component in the z-direction is continuous, i.e., $$u_z(x,-h) = u_z^{(f)}(x,-h). \qquad (26)$$

Further, the traction must be continuous across the solid-fluid interface, i.e., $$\sigma_{zz}(x,-h) = \sigma_{zz}^f(x,-h),\ \sigma_{zx}(x,-h) = \sigma_{zx}^f(x,-h). \qquad (27)$$

On the top surface of the plate, it is still traction-free, i.e., $$\sigma_{zz}(x,h)=0,\ \sigma_{zx}(x,h)=0. \qquad (28)$$

Substitute (2) and (23) into (26), (8) and (25) into (27) and (25) into (28) yields $$\begin{bmatrix} D_{11} & D_{12} & D_{33} & D_{34} & 0 \\ D_{21} & D_{22} & D_{43} & D_{44} & 0 \\ -D_{11} & -D_{12} & D_{33} & D_{34} & 0 \\ -D_{21} & -D_{22} & D_{43} & D_{44} & D_{45} \\ D_{51} & D_{52} & D_{53} & D_{54} & D_{55} \end{bmatrix} \begin{bmatrix} B_2 \\ A_1 \\ B_1 \\ A_2 \\ C \end{bmatrix} = 0. \qquad (29)$$

For non-trivial solution, the determinate must vanish, which leads to the dispersion equation $$\overline{\Delta}_S\overline{\Delta}_A - iQ[\overline{\Delta}_S \cos(\alpha_L h)\cos(\alpha_T h) - \overline{\Delta}_A \sin(\alpha_L h)\sin(\alpha_T h)] = 0, \qquad (30)$$

where $\overline{\Delta}_S$ and $\overline{\Delta}_A$ are defined by (20) and (21), respectively, and $$Q = \frac{1}{2}\frac{\rho_f}{\rho}\frac{\omega^4}{c_T^4}\frac{\alpha_L}{\alpha_f}. \qquad (31)$$

In general, for a given real frequency ω, Eq. (30) has complex roots for k. These complex roots represent wave propagation with attenuation. The real part of k represents the propagating part (wavenumber) whereas the imaginary part of k represents the attenuation. The attenuation is due to the leaking of energy from the plate into the fluid. The roots of the dispersion equation are presented by two sets of dispersion curves—the propagation dispersion curves featuring frequency versus the real part of k, such as those shown in FIG. 8, and the attenuation dispersion curves featuring frequency versus the imaginary part of k, such as those shown in FIG. 9. Note that when pf=0, the dispersion equation (30) reduces to (20).

What is claimed is:

1. A method to determine a fill level of material inside a vessel comprising relating attenuation of guided waves to the fill level wherein a relationship between attenuation of guided waves and the fill level is determined by:
    a) inducing vibration in the wall of said vessel from an external source,
    b) measuring the attenuation of the guided wave vibrations in the wall of said vessel,
    c) relating attenuation of the guided wave vibrations to the fill level;
    wherein an A0 mode is generated for the guided wave vibrations and used for attenuation measurement at a frequency of less than 150 kHz.

2. The method of claim 1 wherein the attenuation of the guided wave vibrations in the wall of said vessel is determined from the vibration signals measured on the exterior wall when the vessel contains different levels of material.

3. The method of claim 1 wherein said guided wave vibrations in the wall of said vessel from the external source attenuate as the vibrations pass through the vessel wall.

4. The method of claim 3 wherein said attenuation of the guided wave vibrations is measured by ultrasonic receivers.

5. The method of claim 4 wherein the attenuation is related to the fluid level in said vessel.

6. The method of claim 1 wherein said material in the vessel is fluid or solid or mixture of fluid and solid.

7. The method of claim 1 wherein inducing the guided wave vibrations in the wall of said vessel from an external source is continuous with constant amplitude and frequency.

8. The method of claim 1 wherein inducing the guided wave vibrations in the wall of said vessel from an external source is intermittent in the form of pulsed vibrations of given shape and with a pre-selected central frequency.

9. The method of claim 1 wherein inducing the guided wave vibration in the wall of said vessel is by an ultrasonic transmitter.

10. The method of claim 1 wherein inducing the guided wave vibrations in the wall of said vessel uses wave-matching wedges to generate certain wave modes.

* * * * *